United States Patent
Kwon

(10) Patent No.: US 9,205,860 B2
(45) Date of Patent: Dec. 8, 2015

(54) REDUCER OF ELECTRIC POWER AUXILIARY STEERING APPARATUS

(71) Applicant: MANDO CORPORATION, Pyeongtaek-si, Gyeonggi-do (KR)

(72) Inventor: Hyun Bi Kwon, Yongin-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/308,620

(22) Filed: Jun. 18, 2014

(65) Prior Publication Data

US 2015/0107384 A1 Apr. 23, 2015

(30) Foreign Application Priority Data

Oct. 22, 2013 (KR) .................. 10-2013-0125905

(51) Int. Cl.
*B62D 3/04* (2006.01)
*B62D 5/04* (2006.01)

(52) U.S. Cl.
CPC ............... *B62D 3/04* (2013.01); *B62D 5/0403* (2013.01); *B62D 5/0409* (2013.01)

(58) Field of Classification Search
CPC ...... B62D 5/0409; B62D 5/0403; B62D 5/04; B62D 5/0421; B62D 5/0424
USPC .................................................. 180/443–446
See application file for complete search history.

(56) References Cited

U.S. PATENT DOCUMENTS

| | | | |
|---|---|---|---|
| 2010/0243367 A1* | 9/2010 | Suzuki et al. | 180/444 |
| 2010/0260448 A1* | 10/2010 | Hafermalz et al. | 384/215 |
| 2014/0083794 A1* | 3/2014 | Ishii | 180/444 |
| 2014/0352467 A1* | 12/2014 | Kwon | 74/400 |

* cited by examiner

*Primary Examiner* — Kevin Hurley
(74) *Attorney, Agent, or Firm* — McDermott Will & Emery LLP

(57) ABSTRACT

Disclosed is a reducer of an electric power auxiliary steering apparatus. According to embodiments of the present invention, impulse noise of a worm shaft bearing caused by fluctuation of a worm shaft can be reduced, and strength of a damping member in a direction toward a worm wheel and an opposite direction thereto is lower than that in other directions, so that the fluctuation of the worm shaft can be more effectively alleviated.

6 Claims, 11 Drawing Sheets

REDUCER OF ELECTRIC POWER AUXILIARY STEERING APPARATUS

CROSS-REFERENCE TO RELATED APPLICATION

This application claims priority from and the benefit under 35 U.S.C. §119(a) of Korean Patent Application No. 10-2013-0125905, filed on Oct. 22, 2013, which is hereby incorporated by reference for all purposes as if fully set forth herein.

BACKGROUND OF THE INVENTION

1. Field of the Invention

The present invention relates to a reducer of an electric power auxiliary steering apparatus. More particularly, the present invention relates to a reducer of an electric power auxiliary steering apparatus in which impulse noise of a worm shaft bearing caused by fluctuation of a worm shaft can be reduced, and strength of a damping member in a direction toward a worm wheel and an opposite direction thereto is lower than that in other directions, so that the fluctuation of the worm shaft can be more effectively alleviated.

2. Description of the Prior Art

FIG. 1 is a sectional view illustrating a reducer of an electric power auxiliary steering apparatus according to the related art.

As illustrated in FIG. 1, the reducer 100 of the electric power auxiliary steering apparatus according to the related art is provided with a worm shaft 103 formed with a worm 101 on an outer peripheral surface thereof. Worm shaft bearings 105A and 105B are mounted at opposite ends of the worm shaft 103 to support the worm shaft 103. In order to prevent the worm shaft bearing 105B from moving in an axial direction of the worm shaft 103, a plug bolt 107 is fastened between a damping coupler 109 and the worm shaft bearing 105B and fixed by a plug nut 111.

The worm shaft 103 is connected with a motor shaft 115 of a motor 113 through the damping coupler 109, and is rotated by driving of the motor 113.

A worm wheel 117 is provided at a side of the worm 101 and engaged with the worm 101 formed on the worm shaft 103. The worm wheel 117 is mounted to a steering shaft 119 for transferring a rotating force of a steering wheel (not illustrated) operated by a driver, and a rotating force of the worm shaft 103 by the driving of the motor 113 is transferred to the steering shaft 119.

The worm shaft 103, the worm wheel 117, and the like are embedded in a gear housing 121, and the motor 113 providing a driving force to the worm shaft 103 is provided at a side of the gear housing 121. A motor cover 123 coupled to the motor 113 and the gear housing 121 are coupled to each other through a bolt 125.

Balls 131 are interposed between an inner race 127 and an outer race 129 of the worm bearing 105B so that the worm bearing 105B supports the rotating worm shaft 103 connected with the motor shaft 115 of the motor 113.

In the reducer of the electric power auxiliary steering apparatus having such a structure as described above, an electronic control device provided to a vehicle controls the motor 113 according to driving conditions of the vehicle, and the rotating force of the worm shaft 103 by the driving of the motor 113 is added to the rotating force of the steering wheel operated by the driver and transferred to the steering shaft 119, so that the steering driving state of the driver can be maintained softly and stably.

However, with the use of the reducer of the electric power auxiliary steering apparatus according to the related art, a clearance between the worm shaft rotated by the driving of the motor and the worm wheel engaged with the worm formed on the worm shaft is increased by friction, thus resulting in noise and inaccurate provision of the auxiliary steering force subsidiary to the steering wheel operating force of the driver.

SUMMARY OF THE INVENTION

The present invention has been made in an effort to solve the above-described problems associated with prior art. An aspect of the present invention is to provide a reducer of an electric power auxiliary steering apparatus in which impulse noise of a worm shaft bearing caused by fluctuation of a worm shaft can be reduced, and strength of a damping member in a direction toward a worm wheel and an opposite direction thereto is lower than that in other directions, so that the fluctuation of the worm shaft can be more effectively alleviated.

The aspect of the present invention is not limited thereto, and other unmentioned aspects of the present invention may be clearly appreciated by those skilled in the art from the following descriptions.

In accordance with one aspect of the present invention, a reducer of an electric power auxiliary steering apparatus is provided. The reducer includes: a damping member including an inner race and an outer race, wherein the inner race is mounted on an outer peripheral surface of a worm shaft bearing coupled to one end of a worm shaft engaged with a worm wheel, a motor shaft being coupled to the other end of the worm shaft, and the outer race is connected with connection parts formed at one portion orienting toward the worm wheel and an opposite portion thereto, respectively, of an outer peripheral surface of the inner race, provided around the inner race, and supported on an inner surface of a gear housing; and a bush member provided between the inner race and the outer race, and formed with through holes through which the connection parts pass, respectively, in a direction toward the worm wheel and an opposite direction thereto.

As described above, according to the embodiments of the present invention, the impulse noise of the worm shaft bearing caused by the fluctuation of the worm shaft can be reduced, and the strength of the damping member in the direction toward the worm wheel and the opposite direction thereto is lower than that in other directions, thereby making it possible to more effectively alleviate the fluctuation of the worm shaft.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, some embodiments of the present invention will be described in detail with reference to the exemplary drawings. In the following description, it should be appreciated that when one component is described as being "connected," "coupled" or "joined" to another component, a third component may be "connected," "coupled," and "joined" between the first and second components, although the first component may be directly connected, coupled or joined to the second component.

Figure 2:
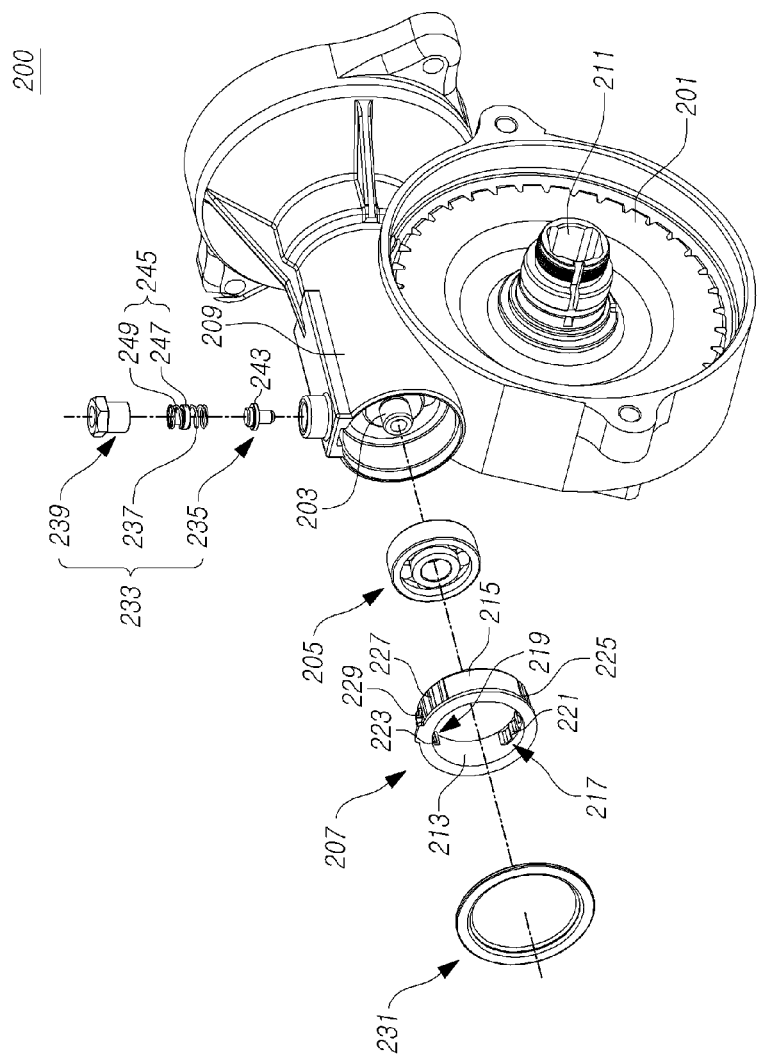
FIG. 2 is a partially exploded perspective view of a reducer of an electric power auxiliary steering apparatus according to an embodiment of the present invention.
Figure 3:
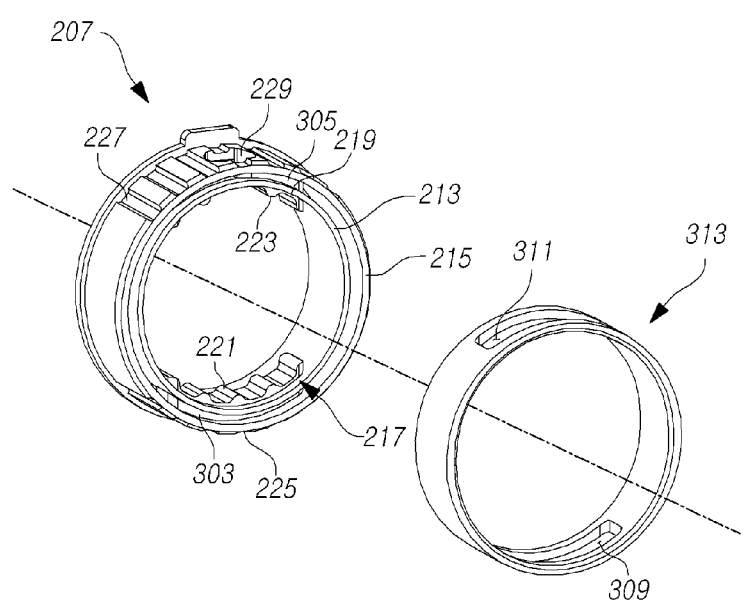
FIG. 3 is an exploded view of a damping member and a bush member illustrated in FIG. 2.
Figure 4:
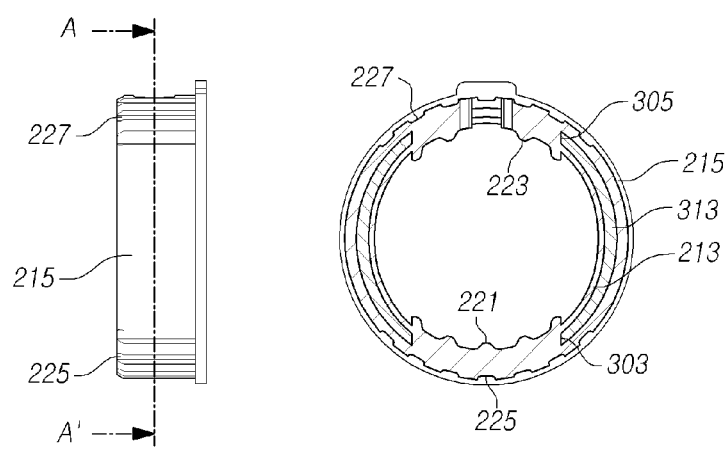
FIG. 4 is a side view and a sectional view taken along line A-A' of the damping member.
Figure 5:
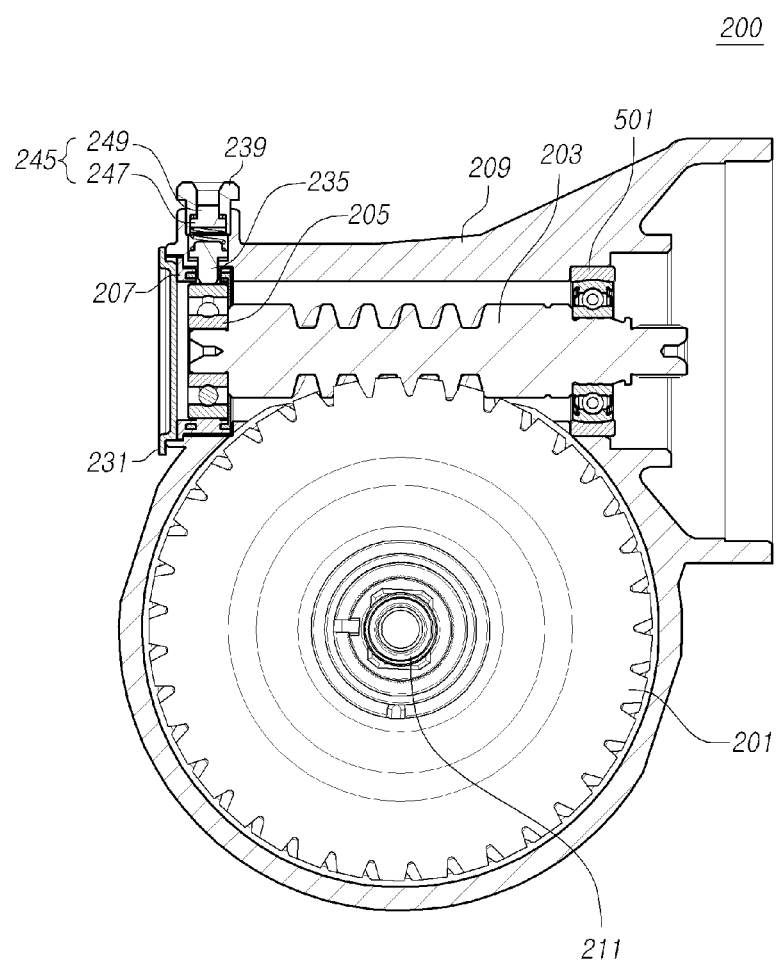
FIG. 5 is a sectional view illustrating an assembled state of the electric power auxiliary steering apparatus illustrated in FIG. 2.
Figure 6:
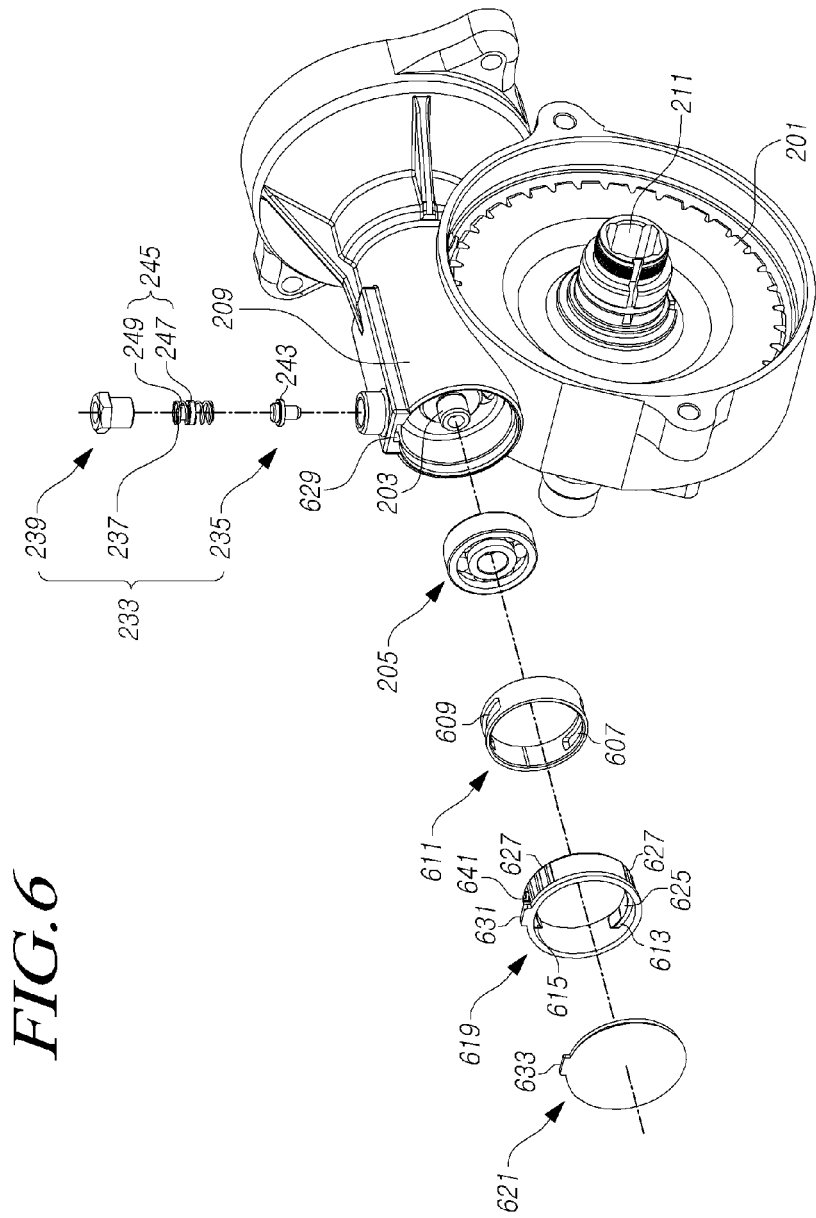
FIG. 6 is a partially exploded perspective view of a reducer of an electric power auxiliary steering apparatus according to another embodiment of the present invention.
Figure 7:
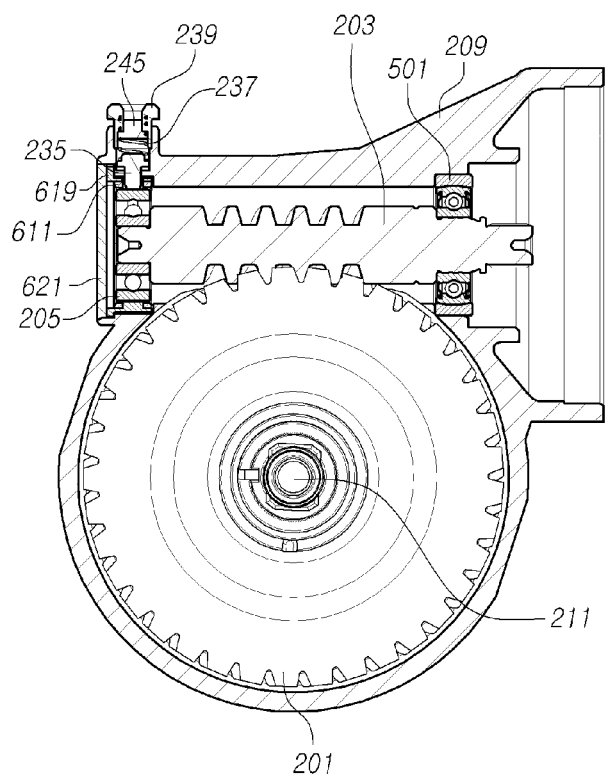
FIG. 7 is a sectional view of FIG. 6.
Figure 8:
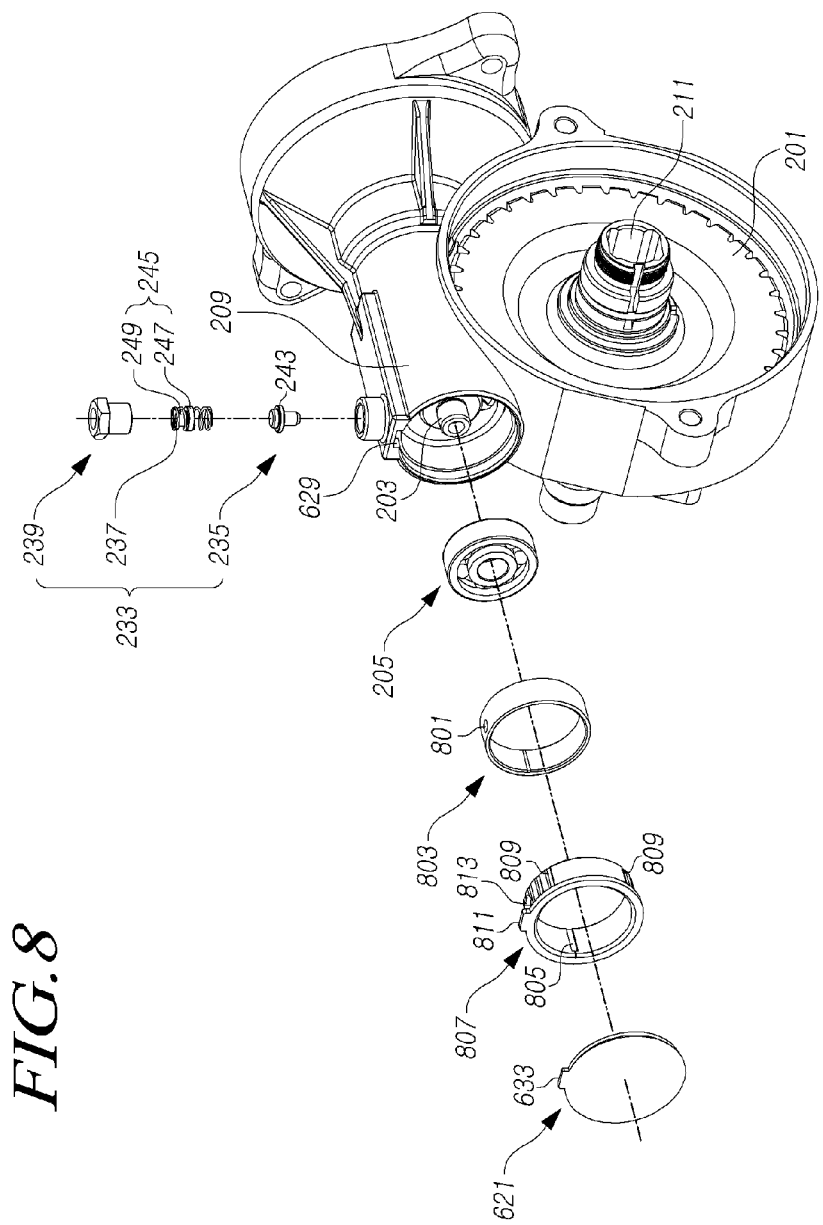
FIG. 8 is a partially exploded perspective view of a reducer of an electric power auxiliary steering apparatus according to another embodiment of the present invention.
Figure 9:
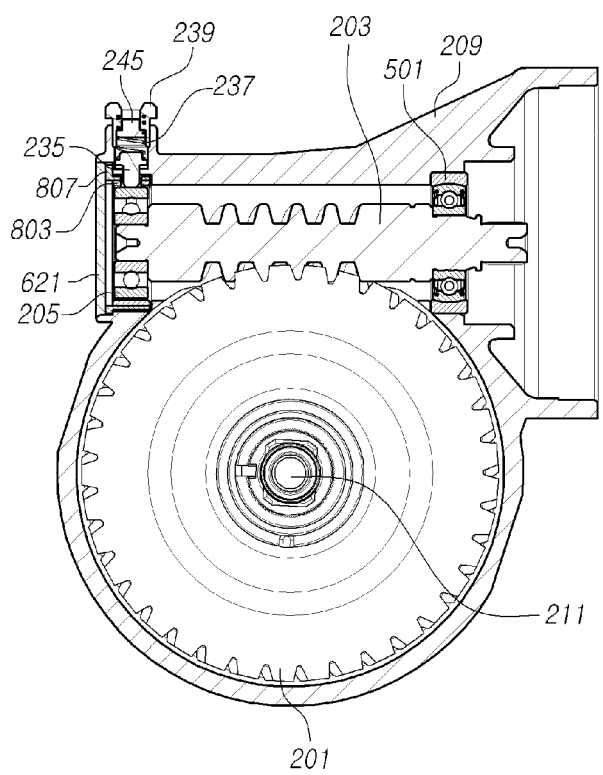
FIG. 9 is a sectional view of FIG. 8.
Figure 10:
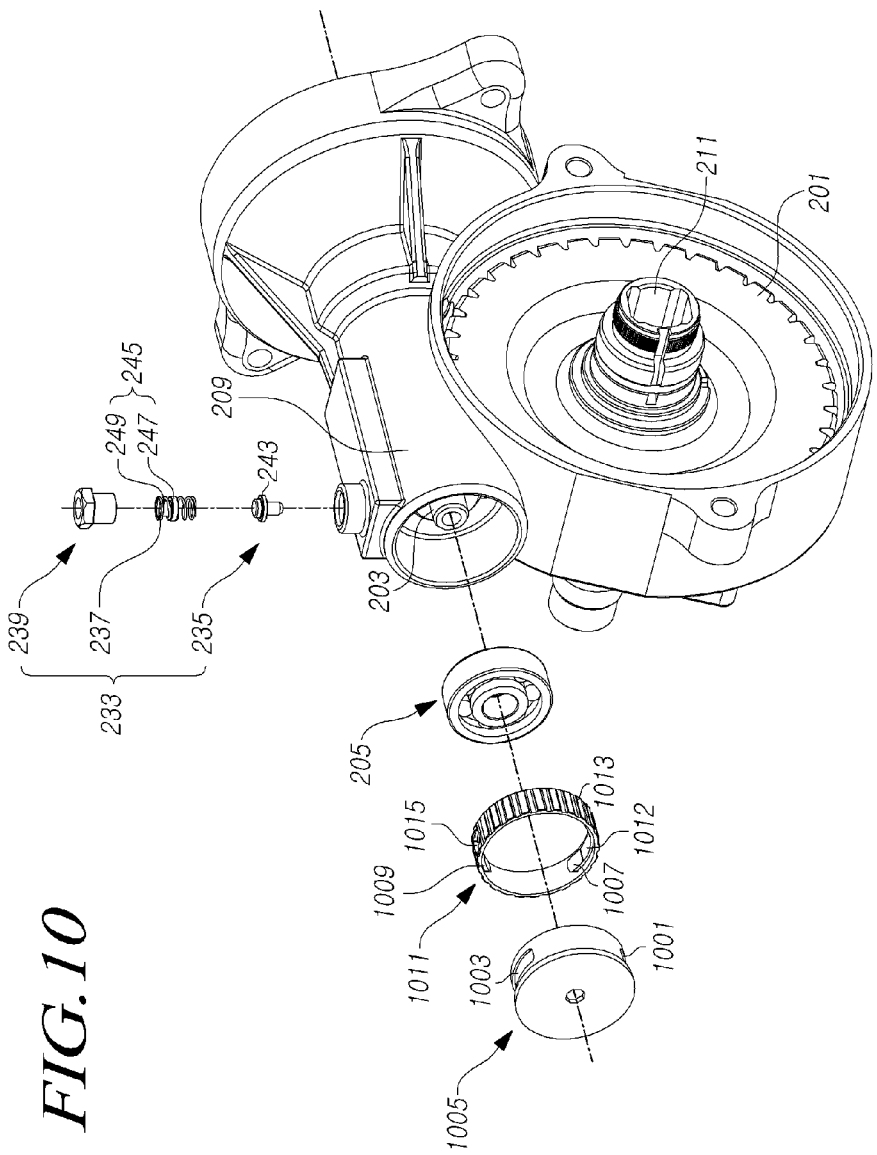
FIG. 10 is a partially exploded perspective view of a reducer of an electric power auxiliary steering apparatus according to another embodiment of the present invention.
Figure 11:
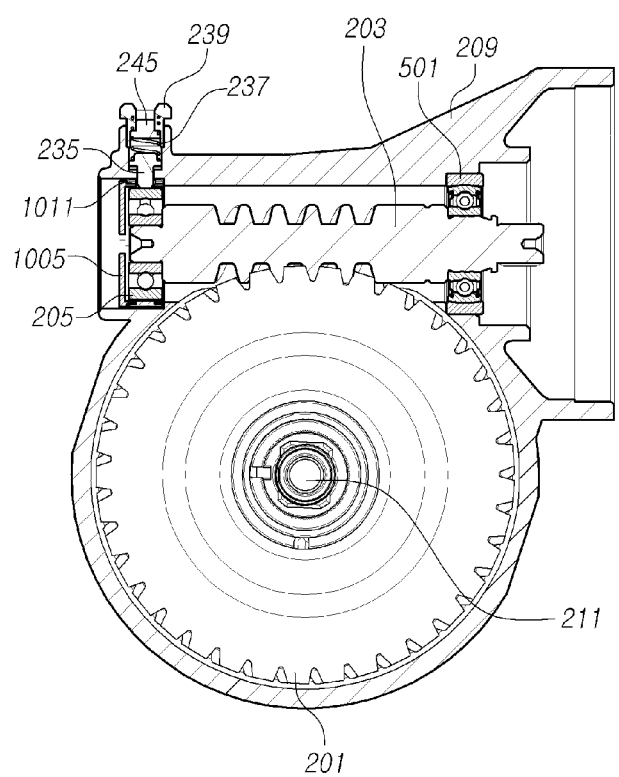
FIG. 11 is a sectional view of FIG. 10.

FIG. 2 is a partially exploded perspective view illustrating a reducer of an electric power auxiliary steering apparatus according to an embodiment of the present invention. FIG. 3 is an exploded view of a damping member and a bush member illustrated in FIG. 2. FIG. 4 is a side view and a sectional view taken along line A-A' of the damping member. FIG. 5 is a sectional view illustrating an assembled state of the electric power auxiliary steering apparatus illustrated in FIG. 2. FIG. 6 is a partially exploded perspective view of a reducer of an electric power auxiliary steering apparatus according to another embodiment of the present invention. FIG. 7 is a sectional view of FIG. 6. FIG. 8 is a partially exploded perspective view of a reducer of an electric power auxiliary steering apparatus according to another embodiment of the present invention. FIG. 9 is a sectional view of FIG. 8. FIG. 10 is a partially exploded perspective view of a reducer of an electric power auxiliary steering apparatus according to another embodiment of the present invention. FIG. 11 is a sectional view of FIG. 10.

Figure 1:
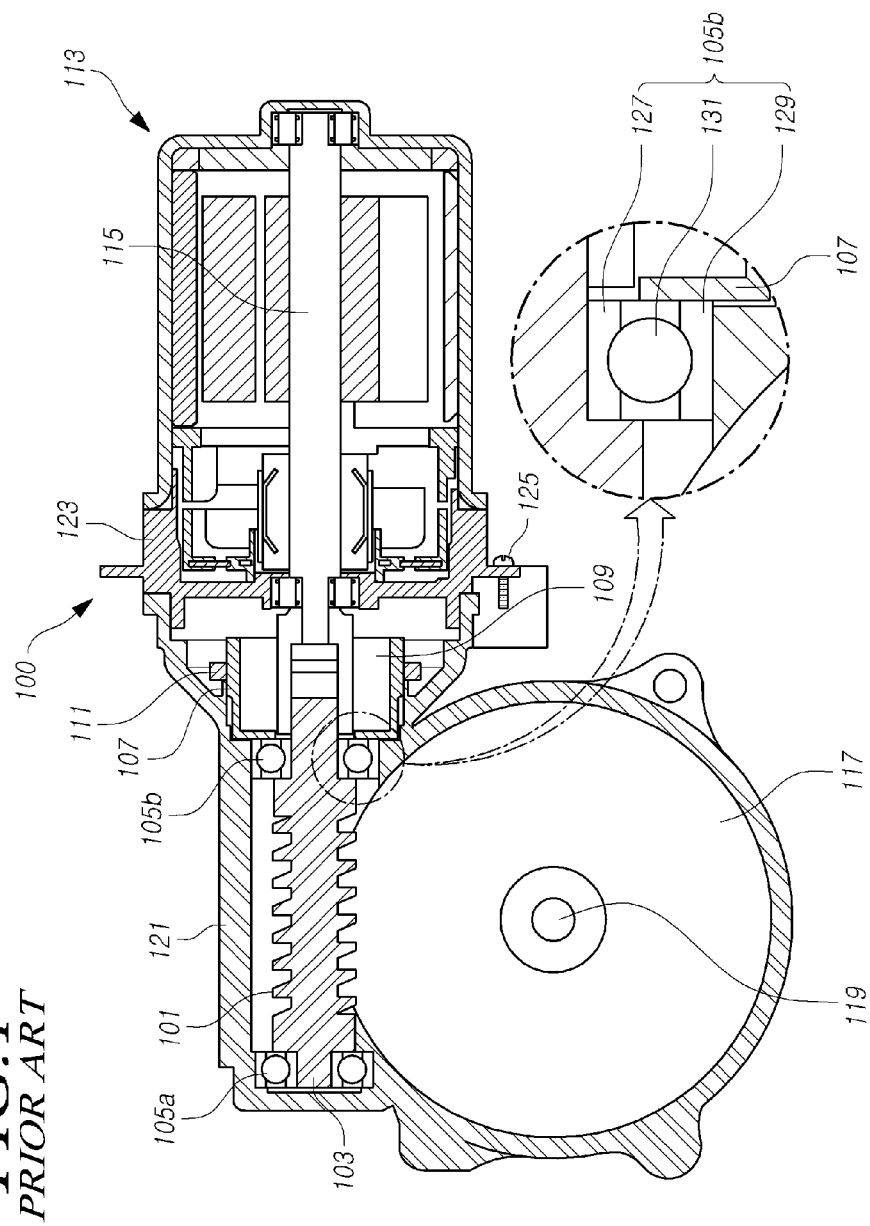
FIG. 1 is a sectional view of a reducer of an electric power auxiliary steering apparatus according to the related art.

Referring to FIG. 1 together with the accompanying drawings, a reducer 200 of an electric power auxiliary steering apparatus according to an embodiment of the present invention includes: a damping member 207 including an inner race 213 and an outer race 215, wherein the inner race 213 is mounted on an outer peripheral surface of a worm shaft bearing 205 coupled to one end of a worm shaft 203 engaged with a worm wheel 201, a motor shaft 115 being coupled to the other end of the worm shaft, and the outer race 215 is connected with connection parts 303 and 305 formed at one portion orienting toward the worm wheel and an opposite portion thereto, respectively, of an outer peripheral surface of the inner race 213, provided around the inner race 213, and supported on an inner surface of a gear housing 209; and a bush member 313 provided between the inner race 213 and the outer race 215, and formed with through holes 309 and 311 through which the connection parts 303 and 305 pass, respectively, in a direction toward the worm wheel and an opposite direction thereto.

Worm shaft bearings 205 and 501 are coupled to opposite ends of the worm shaft 203, respectively, to support the worm shaft 203. The worm wheel 201 is engaged with the worm shaft 203, and rotates in conjunction with the worm shaft 203 when the worm shaft 203 rotates. A steering shaft 211 is coupled to the worm wheel 201, and as an auxiliary steering force, a driving force of a motor (not illustrated) is transferred to the steering shaft 211 through the worm shaft 203 and the worm wheel 201.

The damping member 207 is formed of a resilient material, and includes the inner race 213 and the outer race 215. The damping member 207 is formed with a structure in which one side edge of each of the inner and outer races 213 and 215 (namely, edges of the inner and outer races orienting in a direction opposite to the other end of the worm shaft 203 to which the motor shaft 115 is coupled) is connected to its counterpart side edge so that one end portion of the damping member is closed, and other side edge of each of the inner and outer races 213 and 215 is not connected to its counterpart side edge so that the other end portion of the damping member is open.

The inner race 213 is mounted on the outer peripheral surface of the worm shaft bearing 205 coupled to one end of the worm shaft 203 engaged with the worm wheel 201, in which the motor shaft 115 is coupled to the other end of the worm shaft 203. The connection parts 303 and 305 are formed at one portion orienting toward the worm wheel and the opposite portion thereto of the outer peripheral surface of the inner race 213, and connected with the outer race 215 which will be described below.

Support parts 219 and 217 may be formed to protrude in a radially inward direction from one portion orienting toward the worm wheel and an opposite portion thereto, respectively, of an inner peripheral surface of the inner race 213 to support the outer peripheral surface of the worm shaft bearing 205. Protrusions 221 and protrusions 223 may be formed to protrude in the radially inward direction from inner peripheral surfaces of the support parts 217 and 219, respectively. The protrusions 221 may be spaced apart from each other in a circumferential direction, and the protrusions 223 may be spaced apart from each other in the circumferential direction. The protrusions 221 and 223 formed on the inner peripheral surfaces of the support parts 217 and 219 as described above may reduce variations in strength due to a thickness difference caused by quality deviation in the manufacturing of the damping member 207.

The resilient inner race 213 of the damping member 207 supports the outer peripheral surface of the worm shaft bearing 205, so that impulse noise of the worm shaft bearing 205 is prevented when the worm shaft 203 fluctuates.

The outer race 215 is connected with the above-described connection parts 303 and 305, provided around the inner race 213, and supported on the inner surface of the gear housing 209. That is, a space is formed between the outer race 215 and the inner race 213, and the outer race 215 and the inner race 213 are connected with each other through the connection parts 303 and 305.

Concave recesses 225 and concave recesses 227 are formed at one portion orienting toward the worm wheel and an opposite portion thereto, respectively, of an outer peripheral surface of the outer race 215. The recesses may be formed on either one portion orienting toward the worm wheel or the opposite portion thereto of an outer peripheral surface of the outer race 215. The recesses 225 are spaced apart from each other in a circumferential direction, and the recesses 227 are spaced apart from each other in the circumferential direction. The portions of the outer race 215 at which the recesses 225 and 227 are formed have lower strength relative to other portions of the outer race 215 at which the recesses 225 and 227 are not formed, so that fluctuation of the worm shaft 203 may be more effectively alleviated in the direction toward the worm wheel and the opposite direction thereto.

At one portion of the damping member 207 orienting toward a direction opposite to the worm wheel, a through hole 229 is formed through the outer race 215, the connection part 305, the inner race 213, and the support part 219. The through hole 229 serves as a passage through which a support member 235 of a pressing control member 233 which will be described below passes. In addition, the through hole 229 may make the strength of the damping member 207 relatively low in the direction opposite to the worm wheel, thereby more effectively alleviating the fluctuation of the worm shaft 203 in the direction orienting toward the worm wheel and the opposite direction thereto.

A cover member 231 is coupled to one end of the gear housing 209 which is opposite to the other end of the gear housing 209 to which the motor shaft 115 is coupled, and closes the gear housing 209, thereby preventing foreign substances from being introduced into the gear housing 209.

The bush member 313 is provided between the inner race 213 and the outer race 215 of the damping member 207, and the through holes 309 and 311 through which the connection parts 303 and 305 pass are formed at one portion of the bush member 313 orienting toward the worm wheel and an opposite portion thereto, respectively.

Although, for convenience of description, the bush member 313 is illustrated to be separated from the damping member 207 in FIG. 3, the bush member 313 may be inserted between the inner race 213 and the outer race 215 of the damping member 207 or formed integrally with the damping member 207 through insert molding.

As described above, the bush member 313 is provided between the inner race 213 and the outer race 215 of the damping member 207 so that a damping characteristic of the damping member 207 in the direction toward the worm wheel and the opposite direction thereto (in the up-down direction) is different from that in the left-right direction.

That is, strength of the bush member 313 in the up-down direction in which the through holes 309 and 311 are formed is lower than that in the left-right direction, so that the damping member 207 may more effectively alleviate the fluctuation of the worm shaft 203 in the direction toward the worm wheel and the opposite direction thereto.

The pressing control member 233 is coupled to the gear housing 209, and presses the outer peripheral surface of the worm shaft bearing 205 to resiliently support the worm shaft bearing 205 in the direction orienting toward the worm wheel, thereby compensating for separation between the worm shaft 203 and the worm wheel 201.

An example of the pressing control member 233 will be described more specifically. The pressing control member 233 includes: the support member 235 passing through the through hole 229 of the damping member 207 to support the outer peripheral surface of the worm shaft bearing 205; a resilient member 237 coupled at one end thereof to the support member 235; and an adjusting member 239 coupled to the gear housing 209, and an inside of which the other end of the resilient member 237 is supported at.

The support member 235 has a cylindrical shape, passes through the through hole 229 of the damping member 207 to support the outer peripheral surface of the worm shaft bearing 205, and is formed with a step support part 243 protruding in a radially outward direction. When one end of the resilient member 237 is coupled to the support member 235, the resilient member 237 is supported on a top surface of the step support part 243.

The resilient member 237 is coupled at one end thereof to the support member 235, and one end of the resilient member 237 is supported on the step support part 243 of the support member 235 as described above. The resilient member 237 may be provided in the form of, for example, a coil spring.

The adjusting member 239 is coupled to the gear housing 209. For example, the adjusting member 239 is screw-coupled to the gear housing 209, and a resilient force of the resilient member 237 is adjusted through control of a length by which the adjusting member 239 is inserted into the gear housing 209.

The other end of the resilient member 237 is supported at the inside of the adjusting member 239, and the adjusting member 239 may be formed in a hollow shape.

A resilient force measurement support member 245 may be coupled to the resilient member 237 such that the resilient force of the resilient member 237 may be conveniently measured through the hollow portion of the adjusting member 239. As illustrated, the resilient force measurement support member 245 includes a large diameter part 247 and a small diameter part 249. The large diameter part 247 is supported by the resilient member 237, and the small diameter part 249 is located inside the adjusting member 239. A worker allows a resilient force measuring instrument to pass through the hollow portion of the adjusting member 239, and the resilient force measuring instrument presses the small diameter part 249 to measure the resilient force of the resilient member 237.

As described above, when the resilient member 237 is provided with the resilient force measurement support member 245, and the adjusting member 239 is formed in the hollow shape, the resilient force of the resilient member 237 may be conveniently measured without a separation of the adjusting member 239 from the gear housing 209. Accordingly, through an adjustment of a coupling length of the adjusting member 239, a proper resilient force may be applied to the outer peripheral surface of the worm shaft bearing 205 through the support member 235.

A reducer of an electric power auxiliary steering apparatus according to another embodiment of the present invention includes: a worm shaft bearing 205 coupled to one end of a worm shaft 203 engaged with a worm wheel 201, a motor shaft being coupled to the other end of the worm shaft; a bearing bush 611 coupled to an outer peripheral surface of the worm shaft bearing 205, and formed with a first through hole 607 and a second through hole 609 at one portion of the bearing bush orienting toward the worm wheel and an opposite portion thereto, respectively; a damping member 619 coupled to an outer peripheral surface of the bearing bush 611, formed at an inner peripheral surface thereof with a first support part 613 passing through the first through hole 607 to support the outer peripheral surface of the worm shaft bearing 205 and a second support part 615 passing through the second through hole 609 to support the outer peripheral surface of the worm shaft bearing 205, and an outer peripheral surface of which is supported on an inner surface of a gear housing 209; a cover member 621 coupled to one end of the gear housing 209, wherein the motor shaft is coupled to the other end of the gear housing 209; and a pressing control member 233 coupled to the gear housing 209, and pressing the outer peripheral surface of the worm shaft bearing 205 to resiliently support the worm shaft bearing 205 in the direction orienting toward the worm wheel, thereby compensating for separation between the worm shaft 203 and the worm wheel 201.

Worm shaft bearings 205 and 501 are coupled to opposite ends of the worm shaft 203, respectively, and are supported on the inner surface of the gear housing 209 to support the worm shaft 203.

The bearing bush 611 is mounted on the outer peripheral surface of the worm shaft bearing 205 coupled to one end of the worm shaft 203 engaged with the worm wheel 201, in which the motor shaft (not illustrated) is coupled to the other end of the worm shaft 203. The bearing bush 611 is formed in a ring shape in which the first through hole 607 and the second through hole 609 are formed at one portion of the bearing bush orienting toward the worm wheel and an opposite portion thereto, respectively. That is, the first through hole 607 and the second through hole 609 are formed to face each other in the bearing bush 611.

The damping member 619 has a ring shape, and is coupled to the outer peripheral surface of the bearing bush 611. The first support part 613 is formed to protrude in a radially inward direction from one portion of the inner peripheral surface of the damping member 619 orienting toward the worm wheel, and the second support part 615 is formed to protrude in the radially inward direction from an opposite portion of the inner peripheral surface of the damping member 619.

Accordingly, when the worm shaft bearing 205, the bearing bush 611, and the damping member 619 are coupled to each other, the first support part 613 of the damping member 619 passes through the first through hole 607 of the bearing bush 611 to support the outer peripheral surface of the worm shaft bearing 205, and the second support part 615 passes through the second through hole 609 of the bearing bush 611 to support the outer peripheral surface of the worm shaft bearing 205.

Meanwhile, a predetermined clearance is formed between the bearing bush 611 and the worm shaft bearing 205 in the direction toward the worm wheel and the opposite direction thereto. When the worm shaft 203 fluctuates in the direction toward the worm wheel and the opposite direction thereto, the first support part 613 and the second support part 615 of the damping member 619 alleviate an impulse between the worm shaft bearing 205 and the bearing bush 611 and also reduce impulse noise.

A recess 625 may be formed on an inner peripheral surface of the first support part 613, and accordingly, a contact surface between the first support part 613 and the outer peripheral surface of the worm shaft bearing 205 is smaller than that between the second support part 615 and the outer peripheral surface of the worm shaft bearing 205.

Due to the recess 625 formed on the first support part 613, strength of the first support part 613 is decreased. The reason for making the strength of the first support part 613 decreased is because, when the pressing control member 233 resiliently supports the outer peripheral surface of the worm shaft bearing 205 in the direction toward the worm wheel, if the first part 613 has high strength, the first support part 613 is not smoothly pressed by the pressing control member 233.

A plurality of axial slot recesses 627 may be formed at one portion of the outer peripheral surface of the damping member 619 orienting toward the worm wheel and an opposite portion thereto. Due to the slot recesses 627 formed on the outer peripheral surface of the damping member 619, a contact surface between the inner surface of the gear housing 209, and one portion of the outer peripheral surface of the damping member 619 orienting toward the worm wheel and the opposite portion thereto is smaller than that between the inner surface of the gear housing 209 and other portions of the outer peripheral surface of the damping member 619.

That is, due to the slot recesses 627 formed at one portion of the outer peripheral surface of the damping member 619 orienting toward the worm wheel and the opposite portion thereto, strength of the damping member 619 in the direction toward the worm wheel and the opposite direction thereto is lower than that in other directions, so that the damping member 619 may more effectively alleviate fluctuation of the worm shaft bearing 205 in the direction toward the worm wheel and the opposite direction thereto.

The damping member 619 may be formed at a tip end thereof with a protruded support part 631 inserted into and supported by an insertion recess 629 formed in the gear housing 209. Due to the protruded support part 631 formed at the damping member 619, even though the worm shaft 203 rotates, the damping member 619 mounted to the gear housing 209 does not rotate about the axis of the worm shaft, and when the damping member 619 is coupled to the gear housing 209, a coupling location of the damping member 619 is conveniently set.

The cover member 621 is coupled to one end of the gear housing 209 which is opposite to the other end of the gear housing 209 to which the motor shaft is coupled. The cover member 621 has a cylindrical shape, and prevents foreign substances from being introduced into the gear housing 209.

Meanwhile, the cover member 621 may be formed at an outer peripheral surface thereof with a protruded insertion part 633 inserted into and supported by the insertion recess 629 formed in the gear housing 209. Due to the protruded insertion part 633 formed at the cover member 621, when the cover member 621 is coupled to the gear housing 209, a coupling location of the cover member 621 is conveniently set.

The pressing control member 233 is coupled to the gear housing 209, and presses the outer peripheral surface of the worm shaft bearing 205 to resiliently support the worm shaft bearing 205 in the direction orienting toward the worm wheel, thereby compensating for separation between the worm shaft 203 and the worm wheel 201.

An example of the pressing control member 233 will be described more specifically. The pressing control member 233 includes: a support member 235 passing through the damping member 619 and the bearing bush 611 to support the outer peripheral surface of the worm shaft bearing 205; a resilient member 237 coupled at one end thereof to the support member 235; and a hollow adjusting member 239 coupled to the gear housing 209, and an inside of which the other end of the resilient member 237 is supported at.

The support member 235 has a cylindrical shape, and passes through the damping member 619 and the bearing bush 611 to support the outer peripheral surface of the worm shaft bearing 205. In the embodiment of the present invention illustrated in FIGS. 6 and 7, the support member 235 passes through the second through hole 609 of the bearing bush 611 and a through hole 641 formed through the second support part 615 and one portion of the outer peripheral surface of the damping member 619 orienting toward a direction opposite to the worm wheel to press the outer peripheral surface of the worm shaft bearing 205.

The support part 235 is formed with a step support part 243 protruding in a radially outward direction, and when one end of the resilient member 237 is coupled to the support member 235, the resilient member 237 is supported on a top surface of the step support part 243.

The resilient member 237 is coupled at one end thereof to the support member 235, and one end of the resilient member 237 is supported on the step support part 243 of the support member 235 as described above. The resilient member 237 may be provided in the form of, for example, a coil spring.

The adjusting member 239 is coupled to the gear housing 209. The adjusting member 239 is formed in a hollow shape, and the other end of the resilient member 237 is supported at the inside of the adjusting member 239.

For example, the adjusting member 239 is screw-coupled to the gear housing 209, and a worker may adjust a length by which the adjusting member 239 is coupled to the gear housing 209, to thereby adjust a resilient force of the resilient member 237.

A resilient force measurement support member 245 may be coupled to the resilient member 237 such that the resilient force of the resilient member 237 may be conveniently measured through the hollow portion of the adjusting member 239. As illustrated, the resilient force measurement support member 245 includes a large diameter part 247 and a small diameter part 249. The large diameter part 247 is supported by the resilient member 237, and the small diameter part 249 is located inside the adjusting member 239. A worker allows a resilient force measuring instrument to pass through the hollow portion of the adjusting member 239, and the resilient force measuring instrument presses the small diameter part 249 to measure the resilient force of the resilient member 237.

As described above, when the resilient member 237 is provided with the resilient force measurement support member 245, and the adjusting member 239 is formed in the hollow shape, the resilient force of the resilient member 237 may be conveniently measured without a separation of the adjusting member 239 from the gear housing 209. Accordingly, through an adjustment of a coupling length of the adjusting member 239, a proper resilient force may be applied to the outer peripheral surface of the worm shaft bearing 205 through the support member 235.

A reducer of an electric power auxiliary steering apparatus according to another embodiment of the present invention includes: a worm shaft bearing 205 coupled to one end of a worm shaft 203 engaged with a worm wheel 201, a motor shaft being coupled to the other end of the worm shaft; a bearing bush 803 coupled to an outer peripheral surface of the worm shaft bearing 205, and formed with a through hole 801 at one portion of the bearing bush orienting toward a direction opposite to the worm wheel; a damping member 807 coupled to an outer peripheral surface of the bearing bush 803, formed with grooves 805 at opposite sides on an inner peripheral surface thereof such that an inner diameter thereof may be reduced in a direction toward the worm wheel, and an outer peripheral surface of which is supported on an inner surface of a gear housing 209; a cover member 621 coupled to one end of the gear housing 209, wherein the motor shaft is coupled to the other end of the gear housing 209; and a pressing control member 233 coupled to the gear housing 209, and pressing the outer peripheral surface of the worm shaft bearing 205 to resiliently support the worm shaft bearing 205 in the direction orienting toward the worm wheel, thereby compensating for separation between the worm shaft 203 and the worm wheel 201.

Here, elements identical to those in FIGS. 6 and 7 illustrating the other embodiment of the present invention are provided with identical reference numerals, and descriptions thereof will be omitted.

The bearing bush 803 is coupled to the outer peripheral surface of the worm shaft bearing 205, and has a ring shape. At one portion of the bearing bush 803 orienting toward the direction opposite to the worm wheel, the through hole 801 is formed through the outer and inner peripheral surfaces of the bearing bush 803. A support member 235 of the pressing control member 233 may pass through a through hole 813 of the damping member 807 and the through hole 801 of the bearing bush 803 to support the outer peripheral surface of the worm shaft bearing 205.

The damping member 807 has a ring shape, and is coupled to the outer peripheral surface of the bearing bush 803. The grooves 805 are formed at the opposite sides on the inner peripheral surface of the damping member 807 so that, when the worm shaft 203 fluctuates in the direction toward the worm wheel and the opposite direction thereto, the inner diameter of the damping member 807 may be smoothly reduced in the direction toward the worm wheel, thereby alleviating the fluctuation of the worm shaft 203.

A plurality of axial slot recesses 809 are formed at one portion orienting toward the worm wheel and an opposite portion thereto of the outer peripheral surface of the damping member 807, and a protruded support part 811 is formed at a tip end of the damping member 807. The slot recesses 809 and the protruded support part 811 perform the same function as that of the slot recesses 627 and the protruded support part 631 of the damping member 619 illustrated in FIGS. 6 and 7. At one portion of the damping member 807 orienting toward the direction opposite to the worm wheel, a through hole 813 is formed through the outer and inner peripheral surfaces of the damping member 807. A support member 235 of the pressing control member 233 may pass through the through hole 813 and the through hole 801 of the bearing bush 803 to press the outer peripheral surface of the worm shaft bearing 205.

A reducer of an electric power auxiliary steering apparatus according to another embodiment of the present invention includes: a worm shaft bearing 205 coupled to one end of a worm shaft 203 engaged with a worm wheel 201, a motor shaft being coupled to the other end of the worm shaft; a bearing bush 1005 open at one axial side thereof and closed at the other axial side thereof such that the worm shaft bearing 205 is inserted into and supported by the bearing bush, and formed with a first through hole 1001 at one portion thereof orienting toward the worm wheel and with a second through hole 1003 at an opposite portion thereof; a damping member 1011 having a ring shape surrounding an outer peripheral surface of the bearing bush 1005, formed on an inner peripheral surface thereof with a first support part 1007 passing through the first through hole 1001 to support the outer peripheral surface of the worm shaft bearing 205 and a second support part 1009 passing through the second through hole 1003 to support the outer peripheral surface of the worm shaft bearing 205, and an outer peripheral surface of which is supported on an inner surface of a gear housing 209; and a pressing control member 233 coupled to the gear housing 209, and pressing the outer peripheral surface of the worm shaft bearing 205 to resiliently support the worm shaft bearing 205 in the direction orienting toward the worm wheel, thereby compensating for separation between the worm shaft 203 and the worm wheel 201.

Here, elements identical to those in FIGS. 6 and 7 illustrating the other embodiment of the present invention are provided with identical reference numerals, and descriptions thereof will be omitted.

The bearing bush 1005 has a cylindrical shape, and is open at one axial side thereof and closed at the other axial side thereof such that the worm shaft bearing 205 is inserted into and supported by the bearing bush. The first through hole 1001 is formed at one portion of the bearing bush 1005 orienting toward the worm wheel, and the second through hole 1003 is formed at the opposite portion of the bearing bush.

The damping member 1011 has the ring shape surrounding the outer peripheral surface of the bearing bush 1005, and the outer peripheral surface of the damping member 1011 is supported on the inner surface of the gear housing 209. The first support part 1007 passing through the first through hole 1001 to support the outer peripheral surface of the worm shaft bearing 205, and the second support part 1009 passing through the second through hole 1003 to support the outer peripheral surface of the worm shaft bearing 205 are formed on the inner peripheral surface of the damping member 1011.

A recess 1012 is formed on the first support part 1007, and a plurality of axial slot recesses 1013 are formed on the outer peripheral surface of the damping member 1011 in a circumferential direction. The recess 1012 and the slot recesses 1013 perform the same function as that of the recess 625 and the slot recesses 627 of the damping member 619 illustrated in FIGS. 6 and 7. At one portion of the damping member 1011 orienting toward the direction opposite to the worm wheel, a through hole 1015 is formed through the outer and inner peripheral surfaces of the damping member 1011. A support member 235 of the pressing control member 233 passes through the through hole 1015 and the second through hole 1003 of the bearing bush 1005 to press the outer peripheral surface of the worm shaft bearing 205.

As described above, according to the embodiments of the present invention, the impulse noise of the worm shaft bearing caused by the fluctuation of the worm shaft can be reduced, and the strength of the damping member in the direction toward the worm wheel and the opposite direction thereto is lower than that in other directions, so that the fluctuation of the worm shaft can be more effectively alleviated.

Even if it was described above that all of the components of an embodiment of the present invention are coupled as a single unit or coupled to be operated as a single unit, the present invention is not necessarily limited to such an embodiment. The scope of the present invention shall be construed on the basis of the accompanying claims in such a manner that all of the technical ideas included within the scope equivalent to the claims belong to the present invention.

| Description of reference numerals | |
|---|---|
| 200: REDUCER OF ELECTRIC POWER AUXILIARY STEERING APPARATUS ACCORDING TO EMBODIMENT OF PRESENT INVENTION | |
| 201: WORM WHEEL | 203: WORM SHAFT |
| 205: WORM SHAFT BEARING | 207: DAMPING MEMBER |
| 209: GEAR HOUSING | 213: INNER RACE |
| 215: OUTER RACE | 217, 219: SUPPORT PART |
| 221, 223: PROTRUSOIN | 303, 305: CONNECTION PART |
| 309, 311: THROUGH HOLE | 313: BUSH MEMBER |

What is claimed is:

1. A reducer of an electric power auxiliary steering apparatus, comprising:

a damping member comprising an inner race and an outer race, wherein the inner race is mounted on an outer peripheral surface of a worm shaft bearing coupled to one end of a worm shaft engaged with a worm wheel, a motor shaft being coupled to the other end of the worm shaft, and the outer race is connected with connection parts formed at one portion orienting toward the worm wheel and an opposite portion thereto, respectively, of an outer peripheral surface of the inner race, provided around the inner race, and supported on an inner surface of a gear housing; and a bush member provided between the inner race and the outer race, and formed with through holes through which the connection parts pass, respectively, in a direction toward the worm wheel and an opposite direction thereto.

2. The reducer of claim 1, wherein support parts are formed to protrude in a radially inward direction from one portion orienting toward the worm wheel and an opposite portion thereto, respectively, of an inner peripheral surface of the inner race to support the outer peripheral surface of the worm shaft bearing.

3. The reducer of claim 2, wherein protrusions are formed to protrude in the radially inward direction from inner peripheral surfaces of the support parts, respectively, and are spaced apart from each other in a circumferential direction.

4. The reducer of claim 3, wherein concave recesses spaced apart from each other in the circumferential direction are formed both at one portion orienting toward the worm wheel and an opposite portion thereto of an outer peripheral surface of the outer race of the damping member, or either at the one portion or the opposite portion.

5. The reducer of claim 4, wherein at one portion of the damping member orienting toward a direction opposite to the worm wheel, a through hole is formed through the outer race, the connection part, the inner race, and the support part.

6. The reducer of claim 5, further comprising:

a pressing control member that is coupled to the gear housing, and presses the outer peripheral surface of the worm shaft bearing to resiliently support the worm shaft bearing in a direction orienting toward the worm wheel, compensating for separation between the worm shaft and the worm wheel, wherein the pressing control member comprises:

a support member passing through the through hole to support the outer peripheral surface of the worm shaft bearing;

a resilient member coupled at one end thereof to the support member; and an adjusting member coupled to the gear housing, wherein the other end of the resilient member is supported at an inside of the adjusting member.

* * * * *